United States Patent [19]

Heberger

[11] 4,302,505
[45] Nov. 24, 1981

[54] DUAL LAYERED ANTISTATIC COATED POLYESTER FILM

[75] Inventor: John M. Heberger, Greer, S.C.

[73] Assignee: American Hoechst Corp., Somerville, N.J.

[21] Appl. No.: 143,701

[22] Filed: Apr. 25, 1980

Related U.S. Application Data

[63] Continuation-in-part of Ser. No. 1,328, Jan. 5, 1979, abandoned, and a continuation-in-part of Ser. No. 8,021, Jan. 31, 1979, Pat. No. 4,214,035.

[51] Int. Cl.³ .................... B32B 27/08; B32B 27/30; B32B 27/36
[52] U.S. Cl. .................................. 428/341; 428/483; 428/524; 430/535; 430/633
[58] Field of Search ................. 428/341, 483, 524

[56] References Cited

U.S. PATENT DOCUMENTS

| 3,264,136 | 8/1966 | Hedge et al. | 428/327 |
| 4,089,997 | 5/1978 | Van Paesschen | 427/172 |
| 4,214,035 | 7/1980 | Heberger | 428/341 |

Primary Examiner—James C. Cannon
Attorney, Agent, or Firm—Richard S. Roberts

[57] ABSTRACT

A polyester film coated with an antistatic coating is provided. The film includes a polyester film support coated on at least one side with a latex coating. The coating includes stearamidopropyldimethyl-$\beta$-hydroxyethylammonium nitrate present in a concentration in the range of between about 2.75 percent and 3.25 percent by weight, based on the total weight of the latex coating. The coating further includes a cross-linkable methylmethacrylate-ethylacrylate-methacrylamide terpolymer having a glass transition temperature in the range of between about 40° C. and 50° C. The terpolymer is present in a concentration in the range of between about 0.75 percent and 1.25 percent by weight, based on the total weight of the latex coating. The weight ratio of the nitrate to the terpolymer ranges between about 2.75:1 to below 3:1.

A process for forming the above film is also disclosed. In this process a latex coating of the composition described above is coated onto a uniaxially drawn polyester film support. The uniaxially drawn film is then heated to drive off the water and thereafter the uniaxially coated film is stretched in a direction normal of the uniaxial drawn film.

11 Claims, No Drawings

DUAL LAYERED ANTISTATIC COATED POLYESTER FILM

CROSS REFERENCE TO RELATED APPLICATIONS

This application is a continuation-in-part of Ser. No. 1,328 filed on Jan. 5, 1979, and now abandoned; and a continuation-in-part of Ser. No. 8,021 filed Jan. 31, 1979, now Pat. No. 4,214,035.

BACKGROUND OF THE DISCLOSURE

1. Field of the Invention

This invention is directed to an improved polyester film having excellent antistatic properties and the process for producing said film. More specifically, the instant invention is directed to a polyester film having improved antistatic properties in combination with improved slip properties and the process for producing the film. Still more specifically, the instant invention is directed to a polyethylene terephthalate film coated with a latex coating which imparts excellent antistatic and slip properties and the process for producing the film.

2. Summary of the Prior Art

The growth of microfilm and magnetic tape markets has significantly increased the utilization of polyester film as supports for these products. However, polyester film becomes electrostatically charged, especially at low relative humidity. This electrostatic charge attracts not only dust and other contaminants, but, additionally, attracts other polyester film supports. For instance, electrostatic forces interfere in the collating, sorting and developing of microfiche cards by causing the cards to stick together.

To overcome this serious problem, antistatic polyester films have been developed. Antistatic polyester film are usually formed by the application of an antistatic coating onto the surface of the polyester film. Many of these coatings have successfully reduced the electrostatic properties of the polyester film to satisfactorily low levels. However, many of these coatings cause blocking. That is, the polyester film coated with an antistatic layer has a coefficient of friction high enough so that one layer of the film does not slip over another or over rollers and other equipment over which the film moves during operation.

Another problem arising from the coating of an antistatic layer onto the surface of a polyester film is the decreased clarity resulting therefrom. This property, usually reported as haze, is very important in microfilm applications. Microfilm must be readable. Light is projected through the film so that the viewer may read the information printed on the film. Poor clarity results in fuzziness and difficulty in reading because of loss of light intensity.

The above discussion indicates the importance of polyester film having good antistatic properties, as well as good slip, or handleability, and clarity. Thus it is critical that the antistatic coating provide all three of these properties. Although the prior art includes disclosure directed to antistatic coating on polyester films none of them produce films having the combination of good antistatic, slip and clarity properties.

U.S. Pat. No. 4,089,997 issued to Van Paesschen et al includes a disclosure of stearamidopropyldimethyl-$\beta$-hydroxyethylammonium nitrate. However, the disclosure in the '997 patent includes additional constitutents, different from those in the instant invention, which do not produce the excellent combination of antistatic, slip and clarity properties.

Not only are the constituents present in the antistatic coating critical to the film's antistatic, slip and clarity properties, but moreover the concentrations of these materials are similarly of great importance. For instance, U.S. Pat. No. 3,264,136 issued to Hedge, discloses a coating which includes 0.2 percent by volume of stearamidopropyldimethyl-$\beta$-hydroxyethylammonium nitrate in combination with the additional constituent, polymethylmethacrylate. This combination of constituents did not produce the combination of antistatic, slip and clarity properties necessary for utilization in polyester film supported microfilm and magnetic tapes.

An additional requirement in antistatic film technology is not directed to the properties of the film. It is not enough that a latex coating provide the important properties discussed above. The latex coating must be stable. That is, the latex coating cannot precipitate out on standing, to form a two-phase system, for at least one week. This property, satisfactory pot life, is necessary for commercial operation of a coating process. One can ill afford to devise an antistatic coating providing excellent antistatic, slip and clarity properties which does not stay emulsified long enough to coat a suitable length of film.

SUMMARY OF THE INVENTION

The instant invention is directed to a polyester film support which not only has outstanding antistatic properties but also very good handleability, that is, good slip properties, as well as excellent clarity. These properties are provided by a latex coating which additionally has excellent pot life.

In accordance with the instant invention, a polyester film is provided. The film, which is biaxially oriented, is coated on at least one side with a latex coating. The latex coating includes stearamidopropyldimethyl-$\beta$-hydroxyethylammonium nitrate present in a concentration in the range of between about 2.75 and 3.25 percent by weight, based on the total weight of the latex coating. Additionally, the coating includes a crosslinked methylmethacrylate-ethylacrylate-methacrylamide terpolymer, having a glass transition temperature in the range of between about 40° C. and 50° C., present in a concentration in the range of between about 0.75 percent and 1.25 percent by weight, based on the total weight of the latex coating. The weight ratio of the two constituents in the latex coating, that is, the ratio of the nitrate to the terpolymer, is in the range of between about 2.75:1 and 3.25:1.

In accordance with the process for forming this film, a uniaxially drawn polyester film is coated with a latex coating, defined above. The uniaxially drawn polyester film is heated by exposure to elevated temperatures whereby the water in the latex coating is driven off. The dried latex coated uniaxially drawn film is then stretched, in a direction normal to that of the uniaxially drawn film, to form the antistatic, biaxially oriented polyester film.

DETAILED DESCRIPTION

Polyester film, upon which the antistatic layer is disposed, may be formed from any thermoplastic film forming polyester produced by condensing a dicarboxylic acid or a lower alkyl diester thereof with a glycol.

Among the dicarboxylic acids or their lower alkyl diesters within the contemplation of this invention include terephthalic; isophthalic; phthalic; 2,5; 2,6; or 2,7-napthalene dicarboxylic; succinic; sebacic, adipic; azelaic, bibenzoic; and hexahydroterephthalic acids; and bis-p-carboxy phenoxy ethane. One or more of these dicarboxylic acids or their lower alkyl diesters is reacted with one or more glycols which include ethylene glycol; 1,3-propanediol; 1,4-butanediol; neopentyl glycol or 1,4-cyclohexanedimethanol. In that one or more diesters may be reacted with one or more glycols, the polyester film of this invention is not limited to homopolyesters but also includes copolyesters.

Of the film forming polyesters within the contemplation of this invention the most preferred is polyethylene terephthalate. Polyethylene terephthalate film is formed from a polymer produced by polymerization of bis(2-hydroxy ethyl) terephthalate. Bis(2-hydroxy ethyl) terephthalate is itself formed as an intermediate by one of two different methods. one method for producing bis(2-hydroxy ethyl) terephthalate is by direct esterification of terephthalic acid and ethylene glycol as described in U.S. Pat. No. 3,050,533. In this method the bi-product of the reaction is water which is distilled from the reaction product. A second method for producing bis(2-hydroxy ethyl) terephthalate is by transesterification of a dialkyl ester of terephthalic acid, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification reaction occurs more rapidly and completely. The transesterification reaction is conducted under conditions of elevated temperature. Preferably, the temperature is in the range of between about the boiling temperature of the reaction mixture to as high as 250° C. The reaction can occur at atmospheric, sub-atmospheric or super-atmospheric pressure. The bi-product of the transesterification reaction is an alkanol, for example, if dimethyl terephthalate is used, methanol is produced. The alkanol is removed from the reaction product. In order to increase the reaction rate, many known catalysts can be employed in the transesterification reaction.

After the bis(2-hydroxy ethyl) terephthalate has been produced it is converted to polyethylene terephthalate by heating at a temperature above the boiling point of the ethylene glycol or the reaction mixture under conditions effecting the removal of the glycol or water. The heating may occur at a temperature as high as 325° C., if desired. During heating, pressure is reduced so as to provide rapid distillation of the excess glycol or water. The final polyethylene terephthalate polymer has an intrinsic viscosity, as measured in orthochlorophenol at 25° C., in excess of 0.3 deciliter per gram. More preferably, the intrinsic viscosity of the polymer ranges from about 0.4 to about 1.0 deciliter per gram, again measured in orthochlorophenol at 25° C. Still more preferably, the polyethylene terephthalate of the instant invention has an intrinsic viscosity of about 0.5 to about 0.7 deciliter per gram as measured in orthochlorophenol at 25° C.

In a preferred embodiment of the process of the instant invention, the polyester film forming polymer is melted and thereafter extruded onto a polished revolving casting drum to form a cast sheet of the polymer. Thereafter, the film is biaxially stretched, that is, the film is stretched in the longitudinal and transverse direction. The first stretching step of the cast sheet may be in either of these two orthogonal directions. The amount of stretching, to impart strength and toughness to the film, can range from about 3.0 to about 5.0 times the original cast sheet dimension in both directions. Preferably, the amount of stretching is in the range of between about 3.2 and 4.2 times the original dimension. The stretching operations are carried out at temperatures in the range of from about the second order transistion temperature to below the temperature at which the polymer softens and melts.

Where necessary, the film is heat treated, after stretching, for a period of time necessary to crystallize the polyester film. In the case of the preferred embodiment wherein polyethylene terephthalate is employed, crystallization imparts stability. When polyethylene terephthalate is heat treated, it is subjected to a temperature in the range of between about 190° C. and 240° C. and, more preferably, in the range of from about 215° C. and 235° C.

The latex coating, which imparts antistatic characteristics, good handleability, and good clarity to the film, is applied, in a preferred embodiment, after the film is uniaxially stretched, that is, after the film is stretched in one direction, but before the film is stretched in the orthogonal direction. In a more preferred embodiment, the polyester film is first stretched in the longitudinal direction, prior to coating. In this preferred embodiment, after longitudinal stretching, the film is coated by any of the well known techniques employed in the art. For example, coating may be effected by roller coating, spray coating slot coating or immersion coating. In a preferred embodiment, the polyester film is coated with a latex coating by means of roller coating.

In a preferred embodiment the uniaxially drawn film is corona treated prior to coating. That is, the film is subjected to a corona discharge by a corona discharge apparatus prior to coating. The discharge treatment decreases the hydrophobic character of the polyester film surface. This permits the water based latex coating to more easily wet the surface and thus improve the adhesion of the coating to the surface.

The latex coating disposed on the polyester film is a latex dispersion of between about 2.75 percent and 3.25 percent by weight, based on the total weight of the latex coating, of stearamidopropyldimethyl-$\beta$-hydroxyethylammonium nitrate. In a more preferred embodiment, the concentration of this ammonium nitrate composition is in the range of between about 2.9 percent and 3.1 percent by weight, again based on the total weight of the latex coating. In a still more preferred embodiment, the concentration of the ammonium nitrate compound is about 3.0 percent by weight, based on the total weight of the latex coating.

The latex coating composition also includes a crosslinkable methylmethacrylate-ethylacrylate-methacrylamide terpolymer, present in a concentration in the range of between about 0.75 percent and 1.25 percent by weight, based on the total weight of the latex coating. The copolymer is further characterized by a glass transistion temperature in the range of between about 40° C. and 50° C. More preferably, the terpolymer is present in a concentration in the range of between about 0.9 percent and 1.1 percent by weight, based on the total weight of the latex coating. In a still more preferred embodiment of the instant invention, the terpolymer is present in a concentration of 1.0 percent by weight, based on the total weight of the latex coating. The glass transition temperature of the terpolymer, in a more preferred embodiment, is in the range of between about 43° C. and 47° C., still more preferably, the glass transition temperature is about 45° C.

The two constituents of the latex coating are present in a weight ratio of between about 2.75:1 and 3.25:1, stearamidopropyldimethyl-β-hydroxy-ethylammonium nitrate to methylmethacrylate-ethylacrylate-methylacrylamide terpolymer. In a more preferred embodiment, the weight ratio of the nitrate to the terpolymer is in the range of between about 2.75:1 to 3.0:1.

After coating, but before stretching in a direction normal to the uniaxially drawn film, the film is dried by heating at a temperature of the range of between about 90° C. and 110° C. More preferably, the rage is between 95° C and 105° C.

In a preferred embodiment, the thickness of the coating, after drying, on the polyester film is at least 0.003 dry pounds of coating per thousand square feet of biaxially drawn film. More preferably, the dry coating weight is in the range of between about 0.003 pounds to 0.007 pounds per thousand square feet of coated film.

In another preferred embodiment, the antistatic coated film is optionally coated on the opposite side with another layer of the antistatic latex composition.

It has been unexpectedly found that when such a polyester film is coated on both sides with the aforementioned antistatic composition, a product is provided which is extremely useful in applications requiring two-sided static build-up protection. For example, a film coated on both sides with antistatic composition is used in conjunction with facsimile reproduction equipment to prevent charge build-up on its spinning drum. A sheet of such film may be used to cover said drum, to cover a paper sheet whose message is being sent via that drum and as antistatic page spacers for a stock of supply paper upon which a message is to be reproduced.

The following examples are given to illustrate the invention. Nothing contained in the examples should, in any way, be interpreted as limiting the scope and spirit of the invention illustrated by these examples.

EXAMPLE 1

Polyethylene terephthalate polymer was melted and extruded through a slit die onto a casting drum maintained at a temperature of about 20° C. The melt froze to form a cast sheet. The cast sheet was longitudinally stretched at a draw ratio of approximately 3.6:1 while maintained at a temperature of about 80° C.

The longitudinally drawn film was corona treated by a corona discharge apparatus and thereinafter coated with a latex coating by reverse gravure coating.

The latex coating, coated onto the surface of the polyester film, included 3.0% by weight, based on the total weight of the coating composition, of stearamidopropyldimethyl-β-hydroxy-ethylammonium nitrate. The coating also included 1.0% by weight, based on the total weight of the coating composition, of methylmethacrylate-ethyl acrylate-methacrylamide terpolymer. The terpolymer is crosslinkable because of the presence of a melamine-formaldehyde crosslinking agent, hexamethoxymethylmelamine, and is characterized by a glass transition temperature of 45° C. The remaining constituent, water, represented 96% by weight of the latex coating. The coating is formed by mixing first the stearamidopropyldimethyl-β-hydroxy-ethylammonium nitrate to the water followed by the terpolymer. The solids are mixed together with the water by conventional mixing techniques to produce a uniform mixture which is the latex coating.

The corona treated, longitudinally drawn, coated film was dried at a temperature of about 100° C. Thereafter, the film was stretched, in the transverse direction, at a draw ratio of 3.6:1 to produce a biaxially drawn film. The biaxially drawn film was heat set at a temperature of 230° C. The final antistatic coating weight range was from 0.003 lb. to 0.007 lb. per 1000 square feet of biaxially drawn film. The total film thickness was approximately 3 mils (0.003 inch).

EXAMPLE 2

A comparison run was conducted in exactly the same manner as Example 1 to produce a biaxially oriented polyethylene terephthalate coated film except the latex was coated on both sides of the film.

EXAMPLE 3

Samples of the PET films formed in accordance with Examples 1-2 were tested for antistatic properties. The antistatic property of the film was measured by a qualitative test. This test, the ash pickup test, includes the steps of cutting standard sized strips of coated film, rubbing the film six times over a cotton fabric and placing the rubbed side of the film one inch above a tray filled with cigarette ashes. Film having excellent antistatic properties will not cause any disturbance of the ashes. If the ashes in the tray are disturbed but are not drawn to the surface of the film, the film is categorized as "good." A film classified as "fair" causes the ashes to be disturbed and approach the surface of the film with slight sticking thereto. A film classified as "poor" is so rated because large quantities of the ash are attracted and held to the surface of the film. It is noted that the test is done a second time to the opposite side of the film. The final classification is the poorer of the two ratings if the two ratings are not the same.

In addition, the latex coatings were rated as stable or unstable. A stable latex coating is one which remains an emulsion for at least one week. An unstable latex coating is one which breaks down into a two-phase system.

Tests of film made in accordance with examples 1 and 2 were determined to have good antistatic and latex stability properties.

The above embodiments and examples illustrate the scope of the instant invention. Other embodiments and examples within the scope of the instant invention are within the contemplation of this invention. Therefore, the scope of this invention should be limited only by the scope of the appended claims.

What is claimed is:

1. A biaxially oriented polyester film comprising a polyester film support coated on both sides with a latex coating, said coating including:
   stearamidopropyldimethyl-β-hydroxy-ethylammonium nitrate, present in a concentration in the range of between 2.75% and 3.25% by weight, based on the total weight of the latex coating; and a crosslinkable methylmethacrylate-ethylacrylate-methacrylamide terpolymer, having a glass transition temperature in the range of between about 40° C. and 50° C., present in a concentration in the range of between about 0.75% and 1.25% by weight based on the total weight of the latex coating wherein the weight ratio of said stearamidopropyldimethyl-β-hydroxy-ethylammonium nitrate to said crosslinkable methylmethacrylate-ethyl acrylate-methacrylamide terpolymer is in the range of between about 2.75:1 and 3.25:1.

2. A biaxially oriented polyester film in accordance with claim 1 wherein the total dry coating weight of said coating on said polyester film is at least 0.003 pounds per 1000 square feet of biaxially oriented film.

3. A polyester film in accordance with claim 2 wherein said total dry coating weight is in the range of between about 0.003 and 0.007 pounds per 1000 square feet of biaxially stretched film.

4. A film in accordance with claim 1 wherein the weight ratio of said stearamidopropyldimethyl-β-hydroxy-ethylammonium nitrate to said crosslinkable methylmethacrylateethyl acrylate-methacrylamide terpolymer is in the range of between about 2.75:1 and 3.0:1.

5. A film in accordance with claim 1 wherein said polyester is polyethylene terephthalate.

6. A film in accordance with claim 1 wherein said stearamidopropyldimethyl-β-hydroxy-ethylammonium nitrate is present in said latex coating in a concentration in the range of between about 2.9% and 3.1% by weight, based on the total weight of said latex coating.

7. A film in accordance with claim 6 wherein said stearamidopropyldimethyl-β-hydroxy-ethylammonium nitrate is present in said latex coating in a concentration in the range of between about 3.0% by weight, based on the total weight of said latex coating.

8. A film in accordance with claim 1 wherein said crosslinkable methylmethacrylate-ethyl acrylate-methacrylamide terpolymer is present in said latex coating in a concentration in the range of between about 0.9% and 1.1% weight based on the total weight of said latex coating.

9. A film in accordance with claim 8 wherein said crosslinkable methylmethacrylate-ethyl acrylate-methacrylamide terpolymer is present in said latex coating in a concentration in the range of about 1.0% weight, based on the total weight of said latex coating.

10. A film in accordance with claim 1 wherein said crosslinkable methylmethacrylate-ethylacrylate-methacrylamide terpolymer has a glass transition temperature of between about 43° C. and 47° C.

11. A film in accordance with claim 10 wherein said crosslinkable methylmethacrylate-ethylacrylate-methacrylamide terpolymer has a glass transition temperature of 45° C.

* * * * *

Disclaimer

4,302,505.—*John M. Heberger,* Greer, S.C. DUAL LAYERED ANTISTATIC COATED POLYESTER FILM. Patent dated Nov. 24, 1981. Disclaimer filed Jan. 7, 1983, by the assignee, *American Hoechst Corp.*

The term of this patent subsequent to July 22, 1997, has been disclaimed.
[*Official Gazette March 29, 1983.*]